Patented Feb. 8, 1949

2,461,070

UNITED STATES PATENT OFFICE 2,461,070

PROCESS TO PRODUCE A STABILIZED PROTEIN-FORMALDEHYDE DISPERSION

Leonard L. McKinney, Peoria, Ill., assignor to the United States of America as represented by the Secretary of Agriculture No Drawing. Continuation of application Serial No. 443,319, May 16, 1942. This application November 26, 1946, Serial No. 712,337

6 Claims. (Cl. 106—146)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes, without the payment to me of any royalty thereon.

This is a continuation of my application for patent Serial No. 443,319, filed May 16, 1942 (now abandoned).

An object of my invention is to prepare a protein dispersion that is tolerant to formaldehyde.

Another object of my invention is to modify protein so that a dispersion may be obtained which does not form a rigid gel when formaldehyde is added.

Another object of my invention is to prepare a concentrated, viscous solution of protein and add formaldehyde without increasing the viscosity of the solution an appreciable amount.

The foregoing objectives are accomplished by treating an alkaline dispersion, suspension, or solution of protein or protein material such as soybean protein or soybean meal, cottonseed protein or cottonseed meal, peanut protein or peanut meal, or other vegetable proteins, or animal protein such as milk casein, gelatin, or the like, with an alkylene oxide and subsequently adding formaldehyde.

It has long been known that when formaldehyde is added to a protein dispersion such as that used for cold water paints, laminating glues, paper coatings, spinning solutions, and leather finishes, a thickening or increase in viscosity and subsequently a rigid gel is obtained. It has been noted that some proteins are more tolerant to formaldehyde than others, and advantage has been taken of this fact to use as much formaldehyde as possible to produce a material as water-resistant as possible. There have also been many attempts to delay the action of formaldehyde by adding such agents as paraformaldehyde, hexamethylenetetramine, and other condensation products of formaldehyde that will slowly give off formaldehyde in order to harden the protein and produce a water-resistant material. Such methods have not proved entirely satisfactory. This condition is especially noted where the formaldehyde-treated protein is not used quickly as in paper coating, water paints, laminating glue, leather finishes, and spinning solutions where the dispersion gels before the batch is used up. According to my invention, an alkylene oxide may be added to the dispersion in an alkaline medium prior to the addition of formaldehyde and a perfectly stable protein dispersion results. If it is desired to obtain an increase in viscosity upon the addition of formaldehyde, such a problem may be solved by decreasing the amount of alkylene oxide used.

It is possible to prepare a laminating glue (Industrial and Engineering Chemistry, vol. 32, page 1002, 1940) from soybean protein to which formaldehyde has been added. Such a dispersion is stable for only one or two days and the protein concentration must be held below 10 percent to prevent gelling. The fact that this dispersion is so low in protein content requires several applications in order to impregnate paper or cloth with sufficient protein for laminating under heat and pressure. I have found that if the dispersion is treated with an alkylene oxide before the formaldehyde is added a perfectly stable dispersion is obtained. Furthermore, the protein content may be raised to 15 or 20 percent so that impregnation of cloth or paper may be carried out in one operation.

The reaction of proteins with formaldehyde is not completely understood. However, there is evidence to support the theory that it reacts with the free amino groups in the protein molecule. There is other evidence which indicates that formaldehyde produces other stabilizing effects on the protein molecule and renders it more water-resistant and more suitable for industrial uses. Such is the case when formaldehyde is used with zein or even with polyamides such as nylon where there are no free amino groups, due to the absence of lysine. Chemistry of the Proteins, by Jordon, 1st ed. (1926), p. 87, and 2d ed. (1938), p. 200. When globular proteins, such as soybean protein or milk casein, are used for making dispersions, such as those used for making spinning solutions, cold water paints, leather finishes, paper coatings, or laminating glue, they are usually given a treatment with dilute acid or alkali to render them more soluble. For example, when soybean protein is prepared as nearly to the native state as possible, it is possible to prepare a dispersion containing only 10 to 12 percent protein without getting a rigid gel. However, if the protein is allowed to stand for a few hours in a 2 percent sodium hydroxide solution as much as 25 percent protein may be put into solution and a viscous, stringy solution is obtained, having all the desirable characteristics of a glue. From a chemical standpoint this alteration of the protein micelle may be explained by assuming that the disulfide linkages of the amino acid cystine, and the amide linkages of the native globular protein are broken and the protein molecule takes on the properties of a linear molecule. If a heavy dispersion of this altered protein is treated with formaldehyde, a gel is likely to occur. This gelling characteristic may be explained by assuming that formaldehyde cross-links the linear protein molecule and thereby forms a three-dimensional molecule which has long been known to gel when formed in solution.

The reaction of alkylene oxides with protein is not understood. However, assuming that the above theory is correct, and reagent which would block off the free amino groups and prevent the cross-linking of formaldehyde would prevent the formation of three-dimensional molecules in solution and thereby prevent gelation. It is known that ethylene oxide undergoes the following reaction with ammonia.

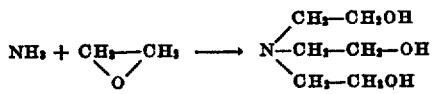

It is therefore possible that alkylene oxides react with the free amino groups of protein and block them off from the action of formaldehyde. The reaction with ethylene oxide is postulated as follows:

Since the nitrogen-to-carbon-linkage is known to be more stable than the carbon-to-oxygen-linkage, such a reaction product would be expected to be quite stable and such appears to be the case. Such a reaction would not be expected to modify the physical properties of the protein molecule to a very great extent because of the relative size and nature of the ethoxy group when compared with the large multi-polar protein molecule. With the exception of the stability toward formaldehyde, the properties of the proteins remain substantially the same as those of proteins not treated with ethylene oxide.

In order to illustrate my invention, the following specific examples are set forth:

*Example 1*

100 gm. soybean protein
200 gm. water added to the protein
4 gm. sodium hydroxide in 200 gm. water added to the wet protein A viscous, glue-like solution was obtained. Ethylene oxide was bubbled into the solution for 3 minutes and allowed to set for 3 hours for reaction to go to completion. Formaldehyde was then added and the dispersion allowed to stand for 1 week. The viscosity did not increase over this period of time.

*Example 2*

150 gm. soybean protein
350 gm. water added to the protein
6 gm. sodium hydroxide in 500 gm. water added
10 gm. ethylene oxide and allowed to stand for 1 hour
15 gm. 37 percent formaldehyde added A viscous solution was obtained which did not gel over a period of 2 weeks.

*Example 3*

100 gm. casein from milk
200 gm. water
10 gm. 28 per cent ammonia in 200 gm. water added to the wet casein
10 gm. ethylene oxide added. Stand 1 hr.
10 gm. 37 per cent formaldehyde added A viscous solution was obtained which was spun into fibers by forcing through a spinnerette into an acid bath.

*Example 4*

100 gm. alkali-treated soybean protein
500 gm. water
10 gm. 28 per cent ammonia in 400 gm. water
Ethylene oxide bubbled into solution for 5 minutes After one hour, 50 cc. of 37 per cent formaldehyde was added without any change in viscosity. When ethylene oxide was not used, gelling occurred.

*Example 5*

100 gm. oil-free cottonseed meal
300 gm. water
5 gm. sodium hydroxide in 200 gm. water.
Heat and stir until viscous dispersion is obtained
Ethylene oxide bubbled through dispersion for 1 minute and allowed to stand 1 hour
10 gm. 37 per cent formaldehyde added A control dispersion to which no ethylene oxide was added increased in viscosity and finally gelled while the dispersion to which ethylene oxide was added was stable.

*Example 6*

Same as Example 5, except oil-free soybean meal was substituted for oil-free cottonseed meal. The results were the same for soybean meal as for cottonseed meal.

*Example 7*

Same as Example 5, except oil-free linseed meal was substituted for cottonseed meal. The control dispersion increased in viscosity but did not gel, while the dispersion treated with ethylene oxide was stable.

*Example 8*

Same as Example 5, except oil-free peanut meal was substituted for cottonseed meal. The control sample increased in viscosity but did not gel.

*Example 9*

Ethylene oxide was bubbled into an alkaline solution of soybean protein for 5 minutes, and the solution was allowed to set for 1 hour for reaction to go to completion. The ethoxylated protein was then precipitated by adding acetic acid to a pH of 4.0. The curd was filtered off and dried. This dried product had very much the same properties as the untreated protein. However, formaldehyde could be added to it without destroying its ability to disperse in alkali. When formaldehyde is added to soybean protein, it will not subsequently disperse in alkali. A plastic disc pressed from the ethoxylated protein gave only 80 percent of the water absorption of the original protein.

*Example 10*

In order to determine the effect of propylene oxide, a 15 percent soybean protein dispersion was prepared using 5 percent sodium hydroxide on the protein weight. The viscous protein dispersion was divided into two parts;

a. 5 percent proplyene oxide added and allowed to stand one hour. 10 percent formalin added. A stable viscous glue-like solution was obtained.

b. 10 percent formalin added. A rigid gel was formed immediately.

The above examples are merely illustrative of various means of carrying out my invention and may be varied widely without departing from the spirit thereof. For example, various other reagents may be used for dispersing protein. Such reagents as borax, sodium fluoride, sodium thiocyanate, trisodium phosphate, amines, etc., are well known to the trade.

Having thus described my invention, I claim:

1. The process for preparing a stable dispersion of formaldehyde and a protein containing free amino groups comprising reacting an alkaline dispersion of the protein with an alkylene oxide, thence adding the formaldehyde to the resulting dispersion.

2. A stable protein-formaldehyde dispersion comprising a mixture of formaldehyde and the reaction product of an alkylene oxide and a protein containing free amino groups in which the reaction between alkylene oxide and protein is carried out in an alkaline medium.

3. A stable protein-formaldehyde dispersion comprising a mixture of formaldehyde and the reaction product of propylene oxide and a protein containing free amino groups in which the reaction between propylene oxide and protein is carried out in an alkaline medium.

4. A stable protein-formaldehyde dispersion comprising a mixture of formaldehyde and the reaction product of an alkylene oxide and soybean protein in which the reaction between alkylene oxide and protein is carried out in an alkaline medium.

5. A stable protein-formaldehyde dispersion comprising a mixture of formaldehyde and the reaction product of an alkylene oxide and milk casein in which the reaction between alkylene oxide and protein is carried out in an alkaline medium.

6. A stable protein-formaldehyde dispersion comprising a mixture of formaldehyde and the reaction product of an alkylene oxide and linseed protein in which the reaction between alkylene oxide and protein is carried out in an alkaline medium.

LEONARD L. McKINNEY.

REFERENCES CITED

The following references are of record in the file of this patent:

UNITED STATES PATENTS

| Number | Name | Date |
| --- | --- | --- |
| 1,979,601 | Bauer | Nov. 6, 1934 |

FOREIGN PATENTS

| Number | Country | Date |
| --- | --- | --- |
| 467,812 | Great Britain | June 22, 1937 |
| 463,043 | Great Britain | Mar. 16, 1937 |